Figure 3:
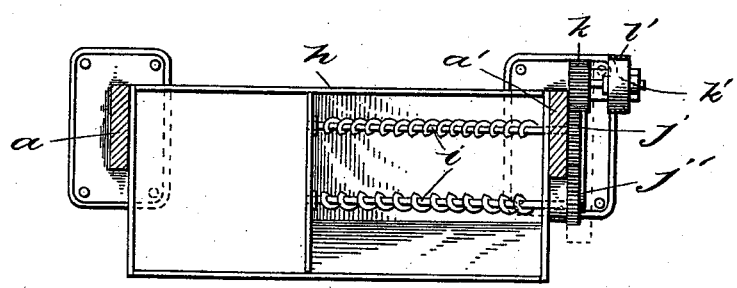

(No Model.) 2 Sheets—Sheet 1.
J. LEE.
KNEADING MACHINE.
No. 524,042. Patented Aug. 7, 1894.
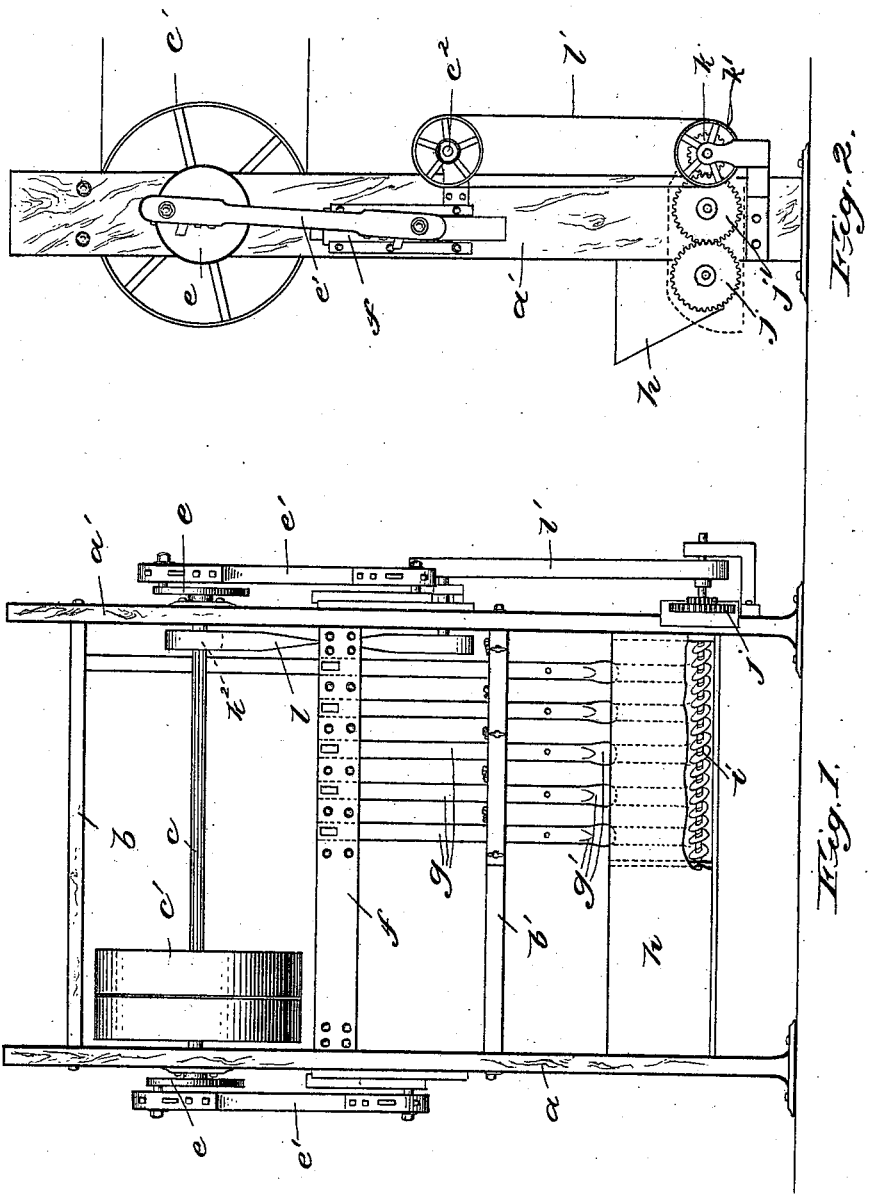
Attest:
H. A. Cushman
C. M. Sweeney.
Inventor:
By Joseph Lee
Lynch and Terrell
Attys.

(No Model.) 2 Sheets—Sheet 2.

J. LEE.
KNEADING MACHINE.

No. 524,042. Patented Aug. 7, 1894.

Witnesses
Inventor
Attorneys

UNITED STATES PATENT OFFICE.

JOSEPH LEE, OF AUBURNDALE, MASSACHUSETTS.

KNEADING-MACHINE.

SPECIFICATION forming part of Letters Patent No. 524,042, dated August 7, 1894.

Application filed March 26, 1894. Serial No. 505,149. (No model.)

*To all whom it may concern:*

Be it known that I, JOSEPH LEE, a citizen of the United States, residing at Auburndale, in the county of Middlesex and State of Massachusetts, have invented certain new and useful Improvements in Kneading-Machines; and I do hereby declare the following to be a full, clear, and exact description of the invention, such as will enable others skilled in the art to which it appertains to make and use the same.

My invention relates to a dough kneading machine and it is my purpose to provide a machine for use in hotels or houses where a quantity of bread or pastry dough is made at one time. By the use of my machine the labor of preparing and kneading such dough is greatly lessened, the object of my invention being to provide a machine, which, while simple in construction and operation, will thoroughly mix and knead the dough and bring it to the desired condition without resorting to the tedious process of mixing and kneading the same by hand, and by the use of my invention a considerable saving of time and labor results and I have found that the dough subjected to the kneading action of the same is of a superior quality and fineness.

I will now describe in detail the construction and operation of my improved kneading machine referring by letter to the drawings which accompany and form a part of this specification, similar letters referring to similar parts in the various figures.

Figure 1 is a front elevation of my improved kneading machine, the position of the screw conveyers and the path of travel of the kneading heads being indicated in dotted lines. Fig. 2 is an end view of the machine, and Fig. 3 is a plan view of the mixing trough to show the position of the screw conveyers.

The frame of the machine consists of two uprights or posts $a, a'$, provided with suitable supporting feet and having cross-beams $b, b'$. Mounted in said posts $a, a'$ near the top, is a horizontal rotary shaft $c$ provided with a driving pulley $c'$ which is connected by a belt with any suitable motor. Said rotary shaft $c$ is provided at each end with cranks $e$, which are connected by pitmen $e'$ to the outer ends of a reciprocating beam or head $f$. The ends of said beam $f$ are mounted in suitable ways in the uprights $a, a'$, and are arranged to slide up and down therein as said beam $f$ receives motion from the rotary shaft $c$ through the cranks $e$ and pitmen $e'$. Secured to said beam $f$ and depending therefrom are arms $g$ which are provided at their lower ends with kneading pestles $g'$. These arms, as will be seen by reference to Fig. 1, pass through apertures in the lower cross beam $b'$ and are guided and steadied thereby in their reciprocating movements.

Mounted in the lower part of the frame of the machine and directly beneath the pestles $g'$ is a dough trough $h$ of any suitable size and shape. Said trough has two horizontal screw conveyers $i$ which are placed near the bottom of the said trough $h$ and on either side of the path of movement of the pestles $g'$. The conveyer shafts have at their outer ends gear wheels $j, j'$ which mesh with each other, and gear wheel $j'$ meshes with a driving pinion $k$ which receives its motion from a small pulley $k'$ which is driven by a small pulley $k^2$ on the main shaft $c$, through the belt $l$, intermediate shaft $c^2$, and belt $l'$. It will be obvious, therefore, that said conveyers $i$ revolve in opposite directions.

The operation of the machine is as follows: The necessary ingredients having been placed in the dough trough $h$, the rotary shaft $c$ is started and the rotary motion of said shaft is, through the cranks $e$ and pitmen $e'$, converted into a reciprocating motion which is imparted to the beam or head $f$ mounted in ways in the posts $a, a'$, and having the depending arms $g$ and pestles $g'$. It is evident then that as beam $f$ reciprocates, said pestles $g'$ are driven with great force into the ingredients of the trough $h$ and they are subjected to a powerful kneading action. The effect of the pestles is, of course, to force the dough from the center of the trough to the sides. As the dough is forced to either side of the trough it is taken by the screw conveyers $i$ and carried forward a short distance and thrown back to the center of the trough again beneath the pestles. It will be readily seen that the action of these two oppositely revolving conveyers is to keep the dough in the center of the trough and at the same time carry it along longitudinally of the trough, so that the dough is carried entirely around the trough and thoroughly mixed and is being continually thrown to the center to receive the kneading action of the pestles. The result of such action on the ingredients produces a dough, which, as I have stated in the premises, is of superior quality, while the simplicity of construction and operation of the machine is such that it can be supplied at a minimum cost, and the practical advantages derived from its use both in economy of time and labor and in the superior quality of its product, are very great.

Having thus described my invention, I claim and desire to secure by Letters Patent—

1. In a machine of the class described, the combination with a driving shaft, of vertically reciprocating kneading devices operated thereby, a kneading trough and rotary mixing devices within said trough, substantially as described.

2. In a machine of the class described, the combination with a driving shaft, of a reciprocating frame operated therefrom, kneading pestles carried thereby, a trough to hold the ingredients to be kneaded, and conveyers in said trough co-operating with said kneading pestles, substantially as described.

3. In a machine for kneading dough, the combination with a rotary driving shaft, of reciprocating kneading devices operated by said shaft, a trough to hold the ingredients to be kneaded, oppositely rotating conveyers within said trough, said conveyers having intermeshing gear-wheels at their outer ends, one of said gear wheels meshing with a pinion driven by said rotary driving shaft, substantially as described.

4. In a machine for kneading dough, the combination with a rotary driving shaft mounted in uprights, of a reciprocating frame sliding in ways in said uprights and receiving its movement from said rotary shaft, depending arms secured to said reciprocating frame, pestles at the ends of said arms, a cross-beam through which said arms pass, a kneading trough beneath said pestles and two rotating conveyers mounted in said trough and driven by said rotary shaft, substantially as described.

5. In a dough kneading machine, the combination with a horizontal rotary shaft having crank arms at each end, of a reciprocating frame mounted beneath said shaft, pitmen connecting said crank arms with the outer ends of said frame, kneading pestles carried by said frame, means for steadying said pestles in their reciprocations, a kneading trough beneath said pestles, and oppositely rotating conveyers within said trough, substantially as described.

In testimony whereof I affix my signature in presence of two witnesses.

JOSEPH LEE.

Witnesses:
MAX KEMPTNER,
E. V. BARTON.